US012679697B2

(12) United States Patent
Harada

(10) Patent No.: US 12,679,697 B2
(45) Date of Patent: Jul. 14, 2026

(54) ELEVATOR DOOR CONTROL DEVICE

(71) Applicant: Mitsubishi Electric Corporation, Tokyo (JP)

(72) Inventor: Tohru Harada, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 1397 days.

(21) Appl. No.: 17/267,498

(22) PCT Filed: Nov. 26, 2018

(86) PCT No.: PCT/JP2018/043424

§ 371 (c)(1),
(2) Date: Feb. 10, 2021

(87) PCT Pub. No.: WO2020/110176

PCT Pub. Date: Jun. 4, 2020

(65) Prior Publication Data

US 2021/0292129 A1 Sep. 23, 2021

(51) Int. Cl.
*B66B 13/14* (2006.01)
*B66B 5/02* (2006.01)

(52) U.S. Cl.
CPC ............ *B66B 13/146* (2013.01); *B66B 5/021* (2013.01)

(58) Field of Classification Search
CPC ....... B66B 13/146; B66B 5/021; B66B 5/027; B66B 13/143
See application file for complete search history.

(56) References Cited

FOREIGN PATENT DOCUMENTS

| | | | | |
|---|---|---|---|---|
| CN | 103508286 | B | * | 4/2016 |
| CN | 104192666 | B | | 2/2017 |
| CN | 108726311 | A | | 11/2018 |
| JP | 11-21052 | A | | 1/1999 |
| JP | 2004189448 | A | * | 7/2004 |
| JP | 2006197750 | A | * | 7/2006 |
| JP | 2012-076862 | A | | 4/2012 |
| JP | 2015-009954 | A | | 1/2015 |

OTHER PUBLICATIONS

Office Action issued Aug. 3, 2022 in Chinese Patent Application No. 201880098737.8, 13 pages.
Office Action issued on Jan. 11, 2022, in corresponding Indian patent Application No. 202147008438, 5 pages.
Chinese Office Action issued Dec. 8, 2022 in corresponding Chinese Patent Application No. 201880098737.8 (with machine-generated English translation), 9 pages.
International Search Report and Written Opinion mailed on Feb. 19, 2019, received for PCT Application PCT/JP2018/043424, Filed on Nov. 26, 2018, 10 pages including English Translation.

* cited by examiner

*Primary Examiner* — Bickey Dhakal
(74) *Attorney, Agent, or Firm* — XSENSUS LLP

(57) ABSTRACT

Provided is an elevator door control device capable of safely closing a door of an elevator when a power failure occurs and preventing an extra burden from being placed on a rescue worker. The elevator door control device according to the present invention includes a door dynamic braking control circuit (15) that performs, when a power failure occurs in a condition in which the door of the elevator is in an intermediate position, dynamic braking control of a door motor (2) until full close of the door is detected and deactivates the dynamic braking control when the full close of the door is detected.

5 Claims, 4 Drawing Sheets

6: DOOR CONTROL CIRCUIT
7: DOOR FULL-CLOSE DETECTION CIRCUIT
9: POWER FAILURE DETECTION CIRCUIT
12: SWITCHING CIRCUIT
14: EMERGENCY CONTROL CIRCUIT
15: DOOR DYNAMIC BRAKING CONTROL CIRCUIT
16: EMERGENCY LIGHTING CONTROL CIRCUIT
17: INTERPHONE CONTROL CIRCUIT
18: EMERGENCY LIGHTING
19: INTERPHONE

6: DOOR CONTROL CIRCUIT
7: DOOR FULL-CLOSE DETECTION CIRCUIT
9: POWER FAILURE DETECTION CIRCUIT
12: SWITCHING CIRCUIT
14: EMERGENCY CONTROL CIRCUIT
15: DOOR DYNAMIC BRAKING CONTROL CIRCUIT
16: EMERGENCY LIGHTING CONTROL CIRCUIT
17: INTERPHONE CONTROL CIRCUIT
18: EMERGENCY LIGHTING
19: INTERPHONE

6: DOOR CONTROL CIRCUIT
7: DOOR FULL-CLOSE DETECTION CIRCUIT
9: POWER FAILURE DETECTION CIRCUIT
12: SWITCHING CIRCUIT
14: EMERGENCY CONTROL CIRCUIT
15: DOOR DYNAMIC BRAKING CONTROL CIRCUIT
16: EMERGENCY LIGHTING CONTROL CIRCUIT
17: INTERPHONE CONTROL CIRCUIT
18: EMERGENCY LIGHTING
19: INTERPHONE

ELEVATOR DOOR CONTROL DEVICE

CROSS-REFERENCE TO RELATED APPLICATION

The present application is based on PCT filing PCT/JP2018/043424, filed Nov. 26, 2018, the entire contents of which are incorporated herein by reference.

FIELD

The present invention relates to an elevator door control device.

BACKGROUND

When a power failure occurs in a condition in which a door of an elevator is in an intermediate position, a phenomenon in which the door rapidly closes may occur. For example, PTL 1 discloses a technology of performing deceleration control of a door motor when a power failure occurs.

CITATION LIST

Patent Literature

[PTL 1] JP H11-21052 A

SUMMARY

Technical Problem

In order to close a door of an elevator at a low speed when a power failure occurs, it is conceivable to perform dynamic braking control of a door motor, for example. However, when the dynamic braking control is being performed, it may be difficult to manually open the door. In this case, the burden on a rescue worker that performs work for rescuing a person trapped in a car after the full close of the door increases.

The present invention has been made in order to solve the abovementioned problem. An object thereof is to provide an elevator door control device capable of safely closing a door of an elevator when a power failure occurs and preventing an extra burden from being placed on a rescue worker.

Solution to Problem

An elevator door control device according to the present invention is provided with a door dynamic braking control circuit to perform when a power failure occurs in a condition in which a door of an elevator is in an intermediate position, dynamic braking control of a door motor until full close of the door is detected; and to deactivate the dynamic braking control when the full close of the door is detected.

Advantageous Effects of Invention

According to the present invention, the dynamic braking control is performed until the full close of the door is detected, and the dynamic braking control is deactivated when the full close of the door is detected. Therefore, the door of the elevator can be safely closed when a power failure occurs, and an extra burden can be prevented from being placed on the rescue worker.

DESCRIPTION OF EMBODIMENTS

Figure 1:
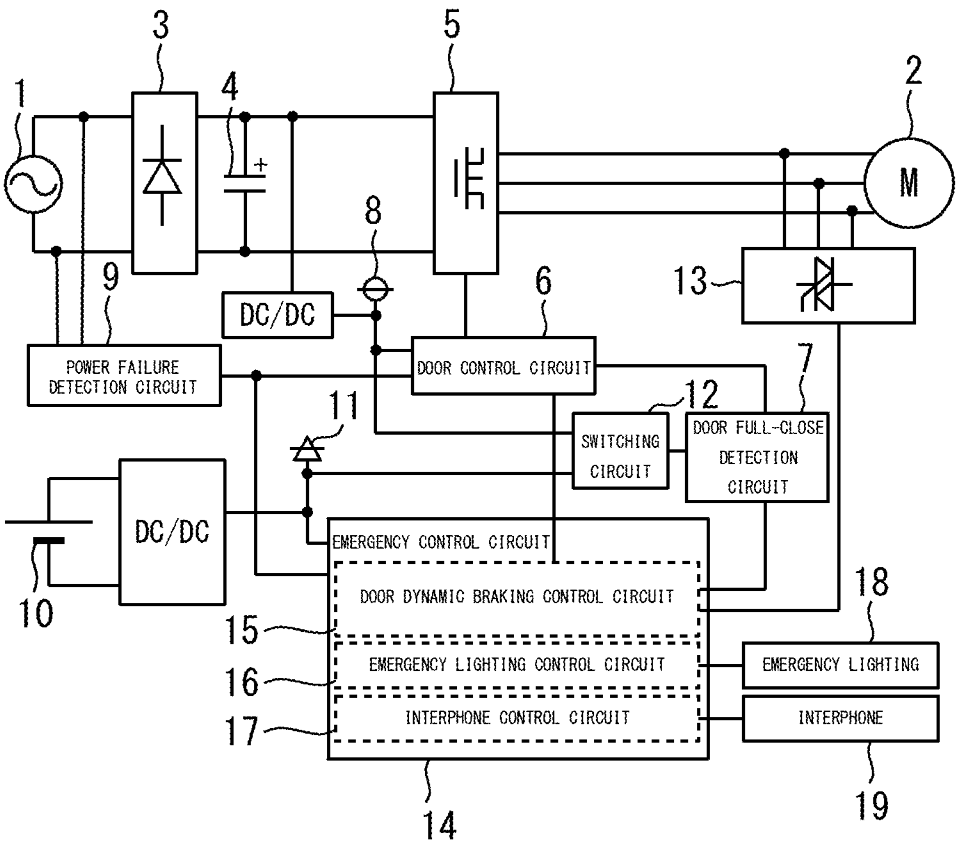
FIG. 1 is an overall block diagram illustrating an elevator door control device in Embodiment 1.

Embodiments are described below with reference to the accompanying drawings. In the FIGURES, the same or corresponding parts are denoted by the same reference numerals. Overlapping descriptions are simplified or omitted, as appropriate.

Embodiment 1

FIG. 1 is an overall block diagram illustrating an elevator door control device in Embodiment 1.

A door control device receives a supply of electric power from a power supply 1 and supplies the electric power to a door motor 2 at normal times. The door motor 2 opens and closes a door of a car of an elevator. As the door motor 2, a PM motor is used, for example.

The door control device includes a converter circuit 3, a smoothing electrolytic capacitor 4, an inverter circuit 5, a door control circuit 6, a door full-close detection circuit 7, a door control power supply 8, a power failure detection circuit 9, an emergency battery 10, an emergency control power supply 11, a switching circuit 12, a shorting circuit 13, and an emergency control circuit 14. The emergency battery 10 is provided in a control panel, for example.

The emergency control circuit 14 includes a door dynamic braking control circuit 15.

The emergency control circuit 14 includes an emergency lighting control circuit 16, for example. The emergency control circuit 14 includes an interphone control circuit 17, for example.

The inverter circuit 5 supplies AC (Alternating Current) power to the door motor 2. The door control circuit 6 controls the door motor 2 via the inverter circuit 5 at normal times.

The door full-close detection circuit 7 detects whether the door of the car of the elevator is in a door full-close condition.

The door control circuit 6 and the door full-close detection circuit 7 receive a supply of electric power from the door control power supply 8 at normal times.

The power failure detection circuit 9 detects that the power supply 1 at normal times is lost when a power failure occurs, for example.

The switching circuit 12 has a function of switching the electric power supply source of the door control circuit 6 and the door full-close detection circuit 7 from the door control power supply 8 for normal times to the emergency control power supply 11.

The shorting circuit 13 has a function of causing a phase-to-phase short-circuit of the door motor 2, for example.

The emergency lighting control circuit 16 and the interphone control circuit 17 operate when the power supply loss of the power supply 1 is detected by the power failure detection circuit 9, for example. The emergency lighting control circuit 16 driving-controls an emergency lighting 18 in the car at the time of a power failure and the like. The interphone control circuit 17 driving-controls an interphone 19 in the car at the time of a power failure and the like.

Figure 2:
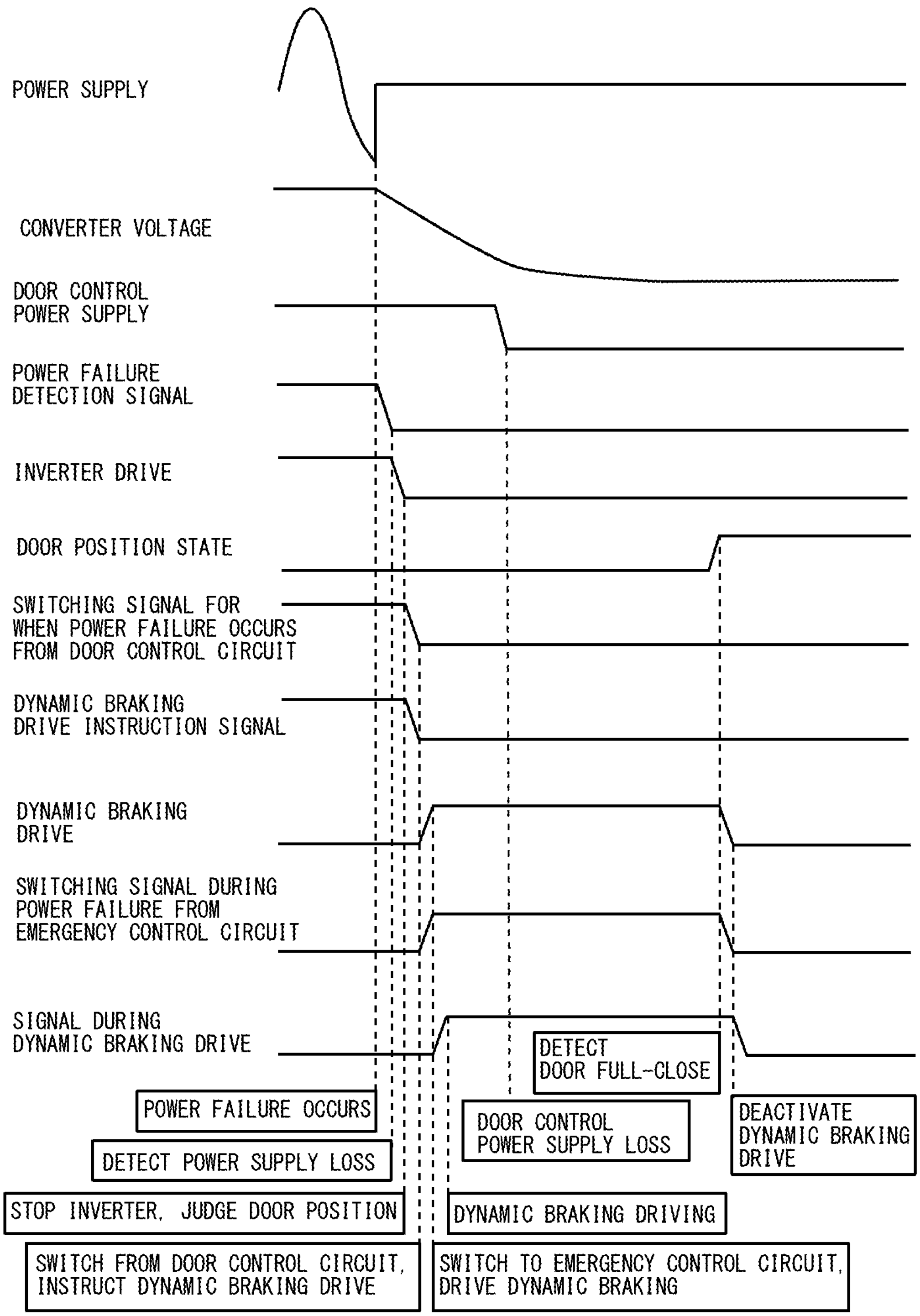
FIG. 2 is a timing chart of the power supplies and signals of the door control device in Embodiment 1 when a power failure occurs.

FIG. 2 is a timing chart of the power supplies and signals of the door control device in Embodiment 1 when a power failure occurs.

When the power failure detection circuit 9 detects the power supply loss of the power supply 1, the door control circuit 6 stops the inverter circuit 5. By reducing the load of the smoothing electrolytic capacitor 4 by stopping the inverter circuit 5 immediately after the power failure occurs as described above, the door control power supply 8 is not lost for a few seconds.

When the power failure detection circuit 9 detects the power supply loss of the power supply 1, the door control circuit 6 performs the judgment of the door position. The judgment of the door position is the judgment of whether the door full-close condition is detected by the door full-close detection circuit 7. When the door full-close condition is not detected, it means that the door is in an intermediate position. The judgment of the door position is performed in a period from the loss of the power supply 1 to the loss of the door control power supply 8.

When the door full-close condition is not detected at the time point of the judgment of the door position, the door control circuit 6 transmits a switching signal for when power failure occurs to the switching circuit 12, and transmits a dynamic braking drive instruction signal to the door dynamic braking control circuit 15 in the emergency control circuit 14.

The door control circuit 6 simultaneously performs the transmission of the switching signal for when power failure occurs and the transmission of the dynamic braking drive instruction signal, for example.

When the door full-close condition is detected at the time point of the judgment of the door position, the door control circuit 6 does not transmit the switching signal for when power failure occurs to the switching circuit 12, and does not transmit the dynamic braking drive instruction signal to the door dynamic braking control circuit 15 in the emergency control circuit 14.

When the switching circuit 12 receives the switching signal for when power failure occurs from the door control circuit 6, the switching circuit 12 shuts down the electric power supply from the door control power supply 8 to the door control circuit 6 and the door full-close detection circuit 7.

When the door dynamic braking control circuit 15 receives the dynamic braking drive instruction signal from the door control circuit 6, the door dynamic braking control circuit 15 transmits a switching signal during power failure to the switching circuit 12. When the switching circuit 12 receives the switching signal during power failure from the door dynamic braking control circuit 15, the switching circuit 12 starts the electric power supply from the emergency control power supply 11 to the door control circuit 6 and the door full-close detection circuit 7.

When the door dynamic braking control circuit 15 receives the dynamic braking drive instruction signal from the door control circuit 6, the door dynamic braking control circuit 15 causes a phase-to-phase short-circuit of the door motor 2 by operating the shorting circuit 13. As a result, the dynamic braking control of the door motor 2 is started.

The door dynamic braking control circuit 15 simultaneously performs the transmission of the switching signal during power failure and the operation start of the shorting circuit 13, for example.

The door dynamic braking control circuit 15 starts the transmission of a signal during the dynamic braking drive to the door control circuit 6 after the operation of the shorting circuit 13 starts, for example.

By the dynamic braking control of the door motor 2, the door close motion of the door is performed at a low speed. Then, when the door full-close detection circuit 7 detects the door full-close condition, the door dynamic braking control circuit 15 deactivates the operation of the switching circuit 12 and the shorting circuit 13 and stops the transmission of the signal during the dynamic braking drive to the door control circuit 6.

Figure 3:
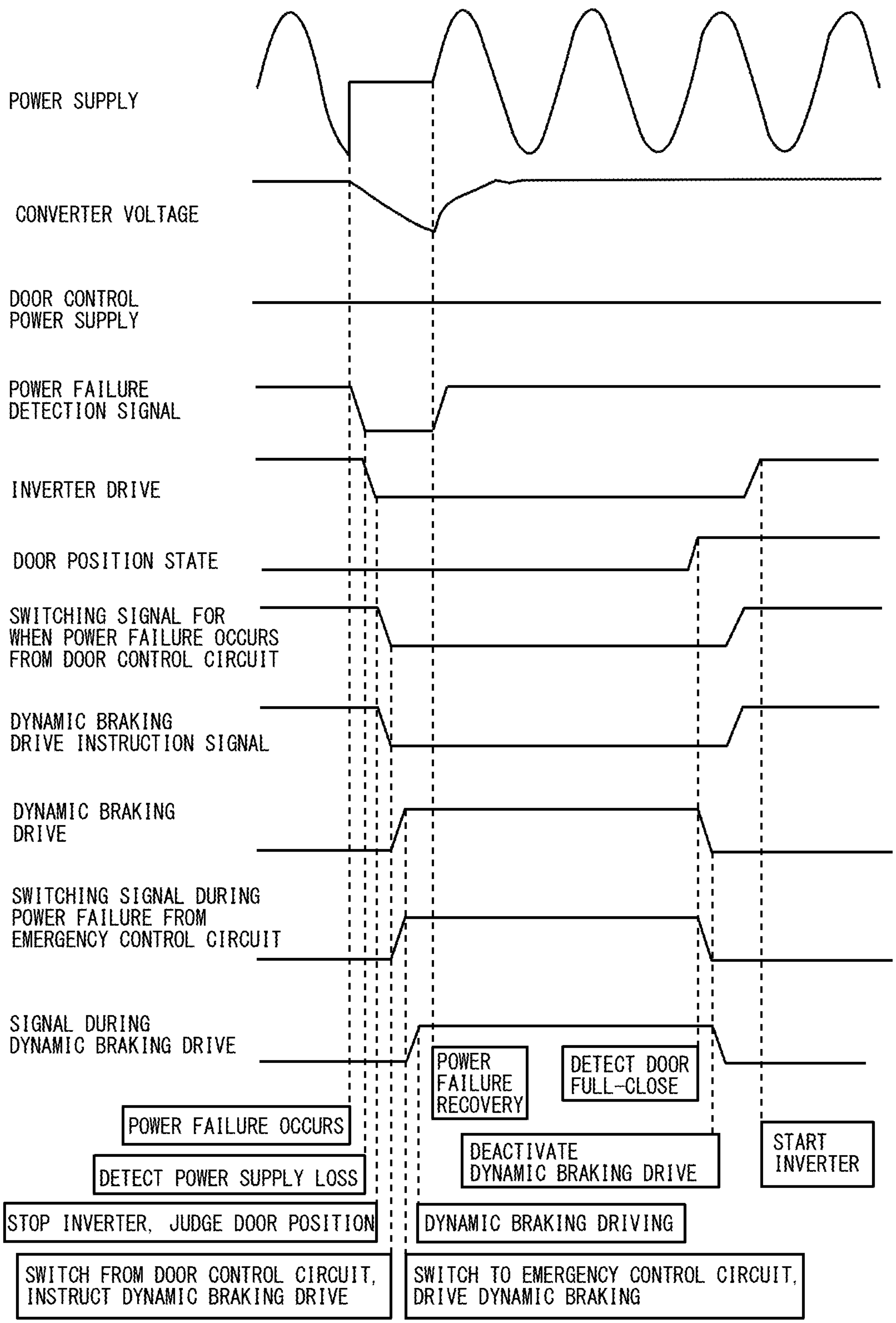
FIG. 3 is a timing chart of the power supplies and the signals of the door control device in Embodiment 1 at the time of a power failure recovery.

FIG. 3 is a timing chart of the power supplies and the signals of the door control device in Embodiment 1 at the time of a power failure recovery.

FIG. 3 shows a case where the power failure recovers at a time point after the door dynamic braking control is started due to the occurrence of the power failure and before the door full-close condition is detected.

Even when the power failure recovers at a timing shown in FIG. 3, the door dynamic braking control circuit 15 continues the dynamic braking control until the door full-close detection circuit 7 detects the door full-close condition. The door dynamic braking control circuit 15 continues the transmission of the signal during the dynamic braking drive until the door full-close detection circuit 7 detects the door full-close condition. The door control circuit 6 does not restart the inverter circuit 5 until the signal during the dynamic braking drive stops.

Then, when the door full-close detection circuit 7 detects the door full-close condition, the door dynamic braking control circuit 15 deactivates the dynamic braking control. When the door full-close detection circuit 7 detects the door full-close condition, the door dynamic braking control circuit 15 stops the transmission of the signal during the dynamic braking drive. The door control circuit 6 restarts the inverter circuit 5 when the signal during the dynamic braking drive stops. As a result, the door control device recovers to a normal door opening-and-closing motion mode.

When the power failure recovers in the condition in which the door is in the full-close condition and the door dynamic braking control circuit 15 is not performing the dynamic braking control, the door control device starts normally.

According to Embodiment 1 described above, when a power failure occurs in a condition in which the door of the elevator is in the intermediate position, the door dynamic braking control circuit 15 performs the dynamic braking control of the door motor 2 until the full close of the door is detected and deactivates the dynamic braking control when the full close of the door is detected. Therefore, the door of the elevator can be safely closed when a power failure occurs, and an extra burden can be prevented from being placed on a rescue worker.

The door control circuit 6 stops the inverter circuit 5 that supplies AC power to the door motor 2 when a power failure occurs, and does not restart the inverter circuit 5 until the dynamic braking control is deactivated when the power failure recovers during a period from when the dynamic braking control is started to when the full close of the door is detected. Therefore, even when the power failure rapidly recovers, the dynamic braking control is performed instead of the normal door opening-and-closing motion until the door completely closes once. As a result, the safety can be reliably improved.

The door dynamic braking control circuit 15 is provided in the existing emergency control circuit 14, for example. In this case, the dynamic braking control of the door motor 2 can be performed by adding a simple circuit to a conventional circuit that controls the emergency lighting 18, the interphone 19, and the like at the time of an emergency.

Embodiment 2

Embodiment 2 is described below. Descriptions overlapping with the first embodiment are omitted, as appropriate.

Figure 4:
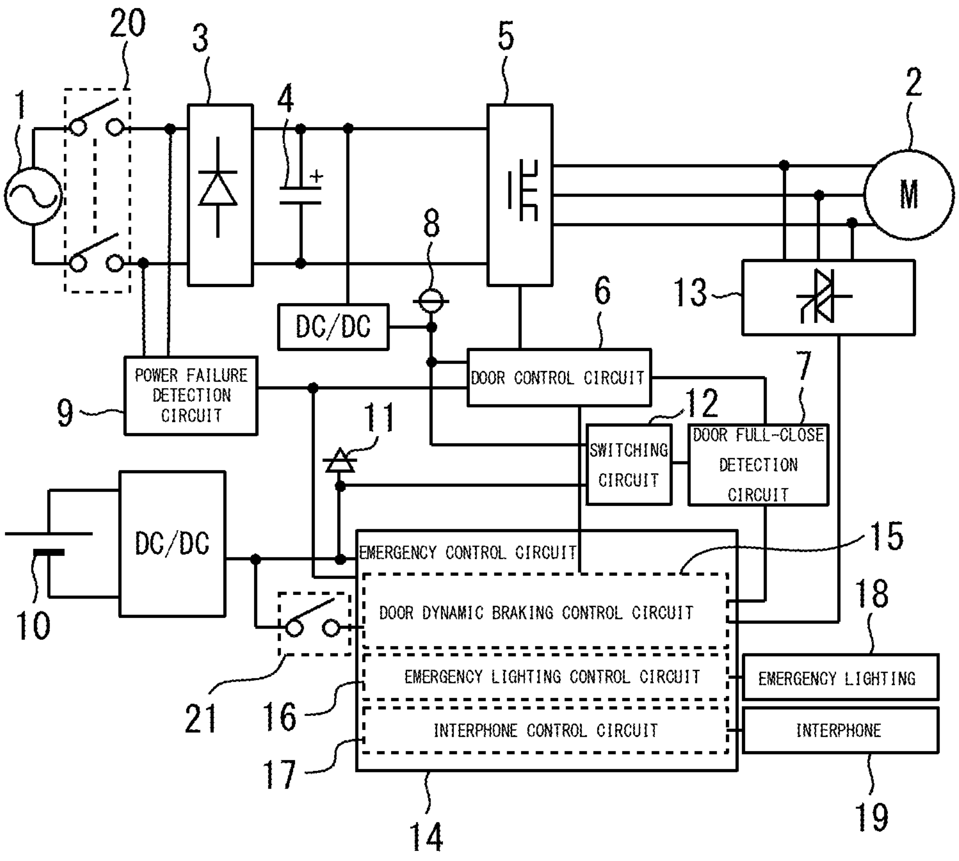
FIG. 4 is an overall block diagram illustrating an elevator door control device in Embodiment 2.

FIG. 4 is an overall block diagram illustrating an elevator door control device in Embodiment 2.

As illustrated in FIG. 4, a door control device shut-down switch 20 is provided between the power supply 1 and the converter circuit 3. The door control device includes an operation mode change-over switch 21.

When the door control device shut-down switch 20 is switched, the electric power supply from the power supply 1 to the door control device is shut down. The door control device shut-down switch 20 is used at the time of maintenance work around the car, for example.

The power failure detection circuit 9 detects the loss of the power supply 1 also when the door control device shut-down switch 20 is used.

The operation mode change-over switch 21 is used for switching the operation mode of the door control device to an automatic operation mode or a maintenance mode, for example. The condition of the operation mode change-over switch 21 is acquired by the door dynamic braking control circuit 15.

When the operation mode change-over switch 21 is not in the condition of the maintenance mode, the door dynamic braking control circuit 15 operates the shorting circuit 13 when receiving the dynamic braking drive instruction signal from the door control circuit 6.

When the operation mode change-over switch 21 is in the condition of the maintenance mode, the door dynamic braking control circuit 15 does not operate the shorting circuit 13 even when receiving the dynamic braking drive instruction signal from the door control circuit 6.

According to Embodiment 2 described above, the door dynamic braking control circuit 15 does not perform the dynamic braking control when the operation mode change-over switch 21 is in the condition of the maintenance mode. In other words, when the operation mode is switched to the maintenance mode by the operation mode change-over switch 21, the dynamic braking control is not performed even when the power supply 1 is lost by the door control device shut-down switch 20 in the condition in which the door is in the intermediate position at the time of maintenance work. Therefore, regardless of the opening and closing condition of the door, the door control device in which the dynamic braking is not effective at the time of maintenance work can be realized. As a result, an extra burden can be prevented from being placed on a maintenance worker that manually opens and closes the door.

The shorting circuits 13 in Embodiments 1 and 2 do not necessarily need to cause the phase-to-phase short-circuit of the door motor 2, for example. For example, when electric charges of the smoothing electrolytic capacitor 4 may reach 0 in a short time, the shorting circuit 13 may have a configuration of only one element that short-circuits bus bars of the converter circuit 3 instead of causing the motor phase-to-phase short-circuit.

INDUSTRIAL APPLICABILITY

As described above, the present invention can be used for an elevator door control device capable of performing dynamic braking control.

REFERENCE SIGNS LIST

1 Power supply
2 Door motor
3 Converter circuit
4 Smoothing electrolytic capacitor
5 Inverter circuit
6 Door control circuit
7 Door full-close detection circuit
8 Door control power supply
9 Power failure detection circuit
10 Emergency battery
11 Emergency control power supply
12 Switching circuit
13 Shorting circuit
14 Emergency control circuit
15 Door dynamic braking control circuit
16 Emergency lighting control circuit
17 Interphone control circuit
18 Emergency lighting
19 Interphone
20 Door control device shut-down switch
21 Operation mode change-over switch

The invention claimed is:

1. An elevator door control device, comprising a door dynamic braking control circuit configured to:

perform, when a power failure occurs in a condition in which a door of an elevator is in an intermediate position, dynamic braking control of a door motor by at least operating a shorting circuit to cause a phase-to-phase short-circuit of the door motor until full close of the door is detected;

deactivate the dynamic braking control when the full close of the door is detected; and a door control circuit configured to stop an inverter circuit that supplies AC power to the door motor when the power failure occurs, and suspend restarting the inverter circuit until the dynamic braking control is deactivated when the power failure recovers during a period from when the dynamic braking control is started to when the door full close is detected.

2. The elevator door control device according to claim 1, wherein the door dynamic braking control circuit is provided in an existing emergency control circuit.

3. The elevator door control device according to claim 2, wherein the door dynamic braking control circuit does not perform the dynamic braking control when an operation mode change-over switch is in a condition of a maintenance mode.

4. The elevator door control device according to claim 1, wherein the door dynamic braking control circuit does not perform the dynamic braking control when an operation mode change-over switch is in a condition of a maintenance mode.

5. The elevator door control device according to claim 1, further comprising a power failure detection circuit configured to detect the power failure.

* * * * *